(12) United States Patent
McLaughlin (10) Patent No.: US 8,977,079 B2
(45) Date of Patent: Mar. 10, 2015

(54) WSS WITH HIGH PORT ISOLATION AND CLOSE SPACED PORTS

(75) Inventor: Sheldon McLaughlin, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 197 days.

(21) Appl. No.: 13/551,953

(22) Filed: Jul. 18, 2012

(65) Prior Publication Data
US 2014/0023316 A1  Jan. 23, 2014

(51) Int. Cl.
*G02B 6/26* (2006.01)

(52) U.S. Cl.
USPC .......................................................... 385/17

(58) Field of Classification Search
None
See application file for complete search history.

(56) References Cited

U.S. PATENT DOCUMENTS

| | | | | |
|---|---|---|---|---|
| 6,570,684 | B1 | 5/2003 | Stone et al. | 398/45 |
| 6,668,115 | B2 * | 12/2003 | Lin et al. | 385/37 |
| 6,738,017 | B2 | 5/2004 | Jacomb-Hood | 342/368 |
| 6,922,498 | B2 | 7/2005 | Shah | 385/17 |
| 7,177,496 | B1 * | 2/2007 | Polynkin et al. | 385/24 |
| 7,321,704 | B2 | 1/2008 | Ducellier et al. | 385/15 |
| 7,415,172 | B2 | 8/2008 | An et al. | 385/10 |
| 8,078,019 | B2 | 12/2011 | Cohen et al. | 385/18 |
| 2001/0009596 | A1 * | 7/2001 | Solgaard et al. | 385/18 |
| 2001/0050787 | A1 * | 12/2001 | Crossland et al. | 359/15 |
| 2003/0095305 | A1 * | 5/2003 | Kewitsch et al. | 359/114 |
| 2006/0067611 | A1 | 3/2006 | Frisken et al. | 385/16 |
| 2014/0016079 | A1 * | 1/2014 | Sakurai | 349/196 |

OTHER PUBLICATIONS

Linnenberger et al., "Advances in Optical Phased Array Technology" Society of Photo Instrumentation Engineers, Sep. 1, 2006, vol. 6304.

* cited by examiner

*Primary Examiner* — Sung Pak
(74) *Attorney, Agent, or Firm* — Teitelbaum & MacLean; Neil Teitelbaum; Doug MacLean (57) ABSTRACT

By steering wanted diffraction orders within a concentrated angular region and steering all unwanted diffraction orders outside that region, a wavelength selective switch achieves high port isolation and densely spaced ports. N inputs receive an optical signal. Optics spatially separate and direct wavelength channels from the signal. A phased array switching engine comprising cells steers a wanted diffraction order of each spatially separated wavelength channel from each cell at an angle within a concentrated angular region relative to the PASE, and steers all unwanted diffraction orders of spatially separated wavelength channels from cells outside the concentrated angular region. Optics direct each wanted diffraction order to one of N outputs in accordance with the steering of the wanted diffraction orders by the PASE. The concentrated angular region is defined by a largest and smallest steering angle wherein the largest steering angle is a margin less than the smallest steering angle.

20 Claims, 10 Drawing Sheets

WSS WITH HIGH PORT ISOLATION AND CLOSE SPACED PORTS

TECHNICAL FIELD

The present invention relates to optical wavelength selective switches having phased array switching engines and more particularly, to wavelength selective switches using phased array switching engines to densely pack output signals and increase port isolation.

BACKGROUND OF THE INVENTION

Figure 1:
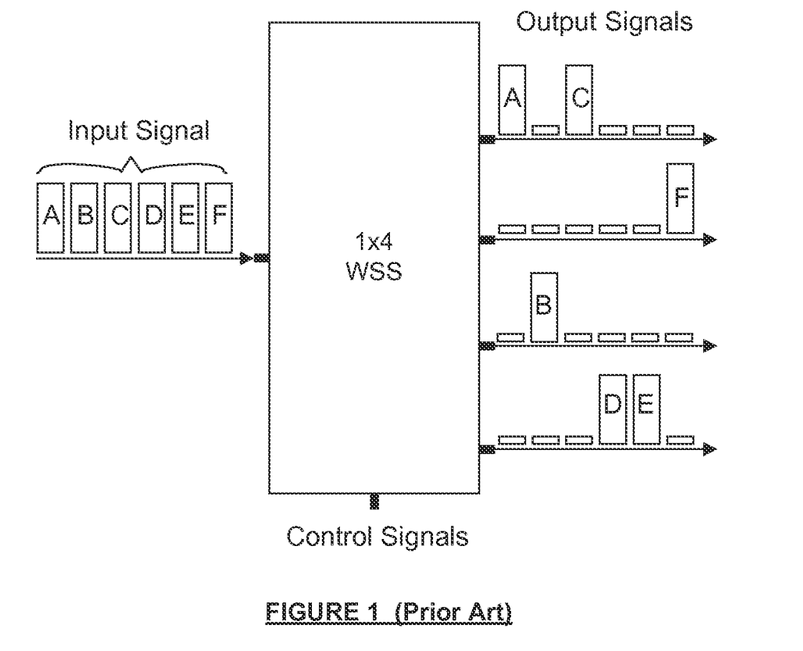
FIG. 1 is a block diagram illustrating an existing wavelength selective switch.

A Wavelength Selective Switch (WSS) is a device used in Reconfigurable Optical Add Drop Multiplexers (ROADMs) in fiber optic telecommunication networks to route optical wavelength channels. Other uses of WSS are contemplated. FIG. 1 illustrates an example 1×4 WSS consisting of a single input port receiving an optical signal comprising wavelength channels (A, B, C, D, E, F) and 4 output ports. The magnitude of each wavelength channel at input and output is represented by the height of its respective column. Through control signals to the WSS, each wavelength channel from the input signal can be dynamically switched or routed to any one of the output ports, independent of how all other wavelength channels are routed.

Within a WSS, an input port receives input light comprising multiplexed wavelength channels. Imaging optics such as diffraction gratings, cylindrical lenses, spherical lenses and other components collimate and spatially disperse different wavelength channels onto a switching engine. The switching engine comprises an array of switching elements, each element of which receives one of the spatially dispersed wavelength channels and imparts to it a programmable tilt. The switching engine may be, for example, an array of tilting microelectromechanical systems (MEMS) mirrors, or a phased array device such as a Liquid Crystal on Silicon (LCOS) pixel array. After each channel has been tilted by the switching engine, imaging optics re-multiplex the wavelength channels and direct them to one of several output ports according to the tilt imparted by the switching engine.

One goal of a WSS is to achieve high port isolation. In an ideal system, perfect port isolation prevents any signals from unselected channels being collected at an output port. Conversely, each output port only receives signals from its selected channels. Thus, to achieve high port isolation, a WSS attempts to direct wanted diffraction orders at selected output ports while preventing unwanted diffraction orders from being received at non-selected output ports. The output signals illustrated in FIG. 1 figuratively demonstrate high port isolation because, at each output port, the magnitude of the selected channel or channels (identified by letter) is much greater than the magnitude of the unselected channels.

High port isolation is not easily achieved in a WSS. When each wavelength channel is diffracted or reflected by a phased array switching engine, multiple diffraction orders are generated and disperse at different angles from the switching engine. The presence of multiple, potentially overlapping, diffraction orders from each wavelength channel within a WSS can significantly decrease port isolation if enough unwanted diffraction orders are received at an output port that is not selected to receive that particular wavelength channel.

Figure 2A:
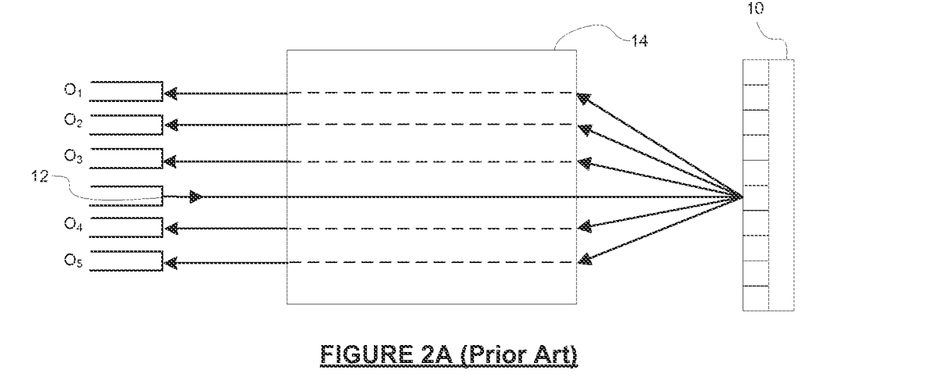
FIG. 2A is an optical diagram illustrating $1^{st}$ order steering of an existing WSS to all output ports.
Figure 2B:
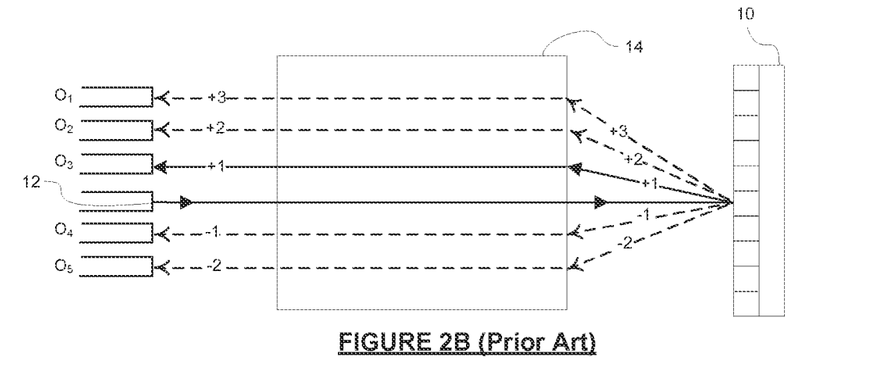
FIG. 2B is an optical diagram illustrating unwanted diffraction orders of the WSS of FIG. 2A.

Referring collectively to FIGS. 2A, 2B, 2C and 2D, the potential overlap of diffraction orders in a WSS is illustrated. FIGS. 2A and 2B illustrate a simplified prior art WSS where the switching engine 10 is normal to the incident light 12, the optical components 14 have been abstracted, and the incident light 12 comprises one wavelength channel and WSS attempts to steer and collect first order (+1) diffractions.

FIG. 2A illustrates that the switching engine 10 can be configured to steer a wanted diffraction order from incident light 12 to be collected at any of the output ports ($O_1$ through $O_5$). FIG. 2A illustrates potential angles of wanted diffraction orders but does not illustrate the unwanted diffraction orders. FIG. 2B illustrates the unwanted diffraction orders (hashed lines) when the switching engine is configured to steer incident light 12 for coupling at output $O_3$. Accordingly, $O_3$ is the selected output port for the diffracted light while $O_1$, $O_2$, $O_4$ and $O_5$ are unselected ports which should not receive any diffracted light to achieve high port isolation. Unfortunately, high port isolation is not achieved in this example because the unwanted diffraction orders are collected at non-selected output ports.

Figure 2C:
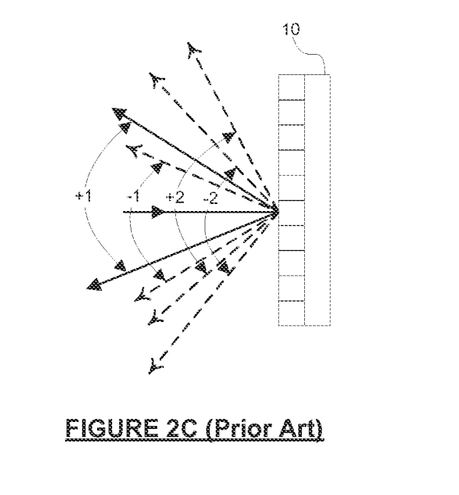
FIG. 2C is an optical diagram of the angular range of $1^{st}$ and $2^{nd}$ order diffractions from the switching engine of FIG. 2A.
Figure 2D:
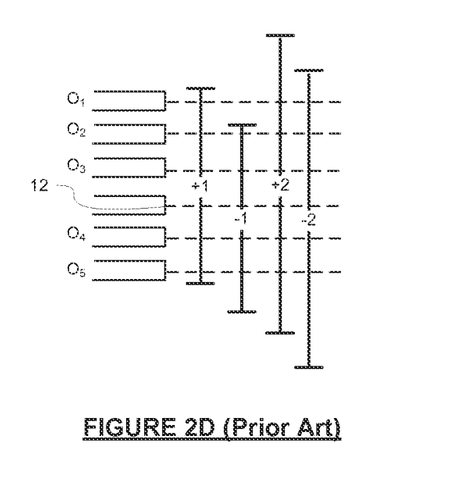
FIG. 2D is an optical diagram of the angular range of $1^{st}$ and $2^{nd}$ order diffractions at the output ports of FIG. 2A.

FIGS. 2C and 2D generalize the problem identified in FIG. 2B for all output angles of the switching engine 10. FIG. 2C illustrates the overlap between possible angular ranges of $1^{st}$ and $2^{nd}$ diffraction orders from the switching array 10. FIG. 2D illustrates the overlap of those angular ranges when collected at the output ports. Without other measures, the WSS of FIGS. 2A, 2B, 2C and 2D cannot achieve high port isolation because the desired (+1) diffraction order steering angle range overlaps with unwanted orders.

Previous attempts to achieve high port isolation in a phased array WSS by reducing coupling of unwanted diffraction orders to non-selected ports typically follow two general approaches, in combination or separately.

Figure 3A:
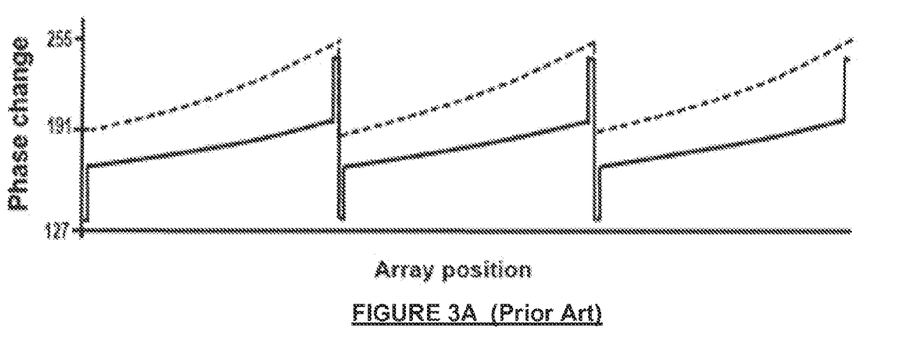
FIG. 3A is a graph illustrating phase shift profiles of cells of an existing phased array switching engine.

The first approach increases WSS design complexity to increase port isolation. Under this approach, the phase profile of the switching array is customized to maximize the efficiency of receiving wanted diffraction orders relative to receiving unwanted diffraction orders. This has been achieved, for example, by overdriving an LCOS at the edges of its phase resets in order to reduce the width of the phase reset regions. With complex calibration and control techniques, the switching engine can be configured so the intensity of unwanted orders is low compared to the intensity of wanted orders. FIG. 3A illustrates a graph of phase change versus array position used to drive a switching engine under this approach. The horizontal axis (array position) represents linear cell position on the switching array. The vertical axis (phase change) represents the phase tilt imparted to incident light at that cell position in the switching array. The hashed line illustrates a common modulo $2\pi$ phase profile. Conversely, the solid line illustrates an example optimized phase profile. Providing dynamic control of a customized phase profile of a phased array switching engine is difficult and requires complex calibration and control techniques to achieve port isolation that is greater than 40 dB when an unwanted diffraction order is directed to a non-selected port. These complex, dynamic calibration and control features make using this first approach undesirable.

The second approach increases port isolation by increasing the size of the output optical aperture of the WSS. The output optical aperture defines an angular region across which the output signals are collected. To maximize the use of the optical aperture of a WSS and minimize physical size, output ports would ideally be separated only by a minimum angular spacing θ, which approximates the angular width of a wavelength channel's beam. This minimum spacing is necessary to avoid a different problem: adjacent port crosstalk. To increase port isolation, this second WSS approach significantly increases the output optical aperture by adding dead zones or empty regions between successive WSS output ports where unwanted diffraction orders may be directed so they are not received by unselected output ports. This approach makes inefficient use of the output optical aperture and undesirably increases the physical size of the WSS.

Figure 3B:
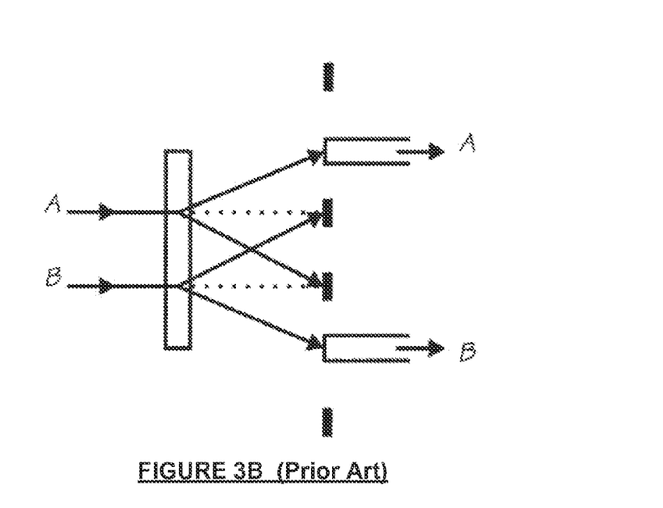
FIG. 3B is an optical diagram of a sparse output optical aperture of an existing WSS.

FIG. 3B illustrates example output ports of the second approach. Two spatially dispersed wavelength channels (A, B) are incident to a phased switching array within a WSS. The two first order diffractions of both channels are illustrated. One of the first order diffractions is collected at an output port while the other is directed at a dead zone between the two output ports. A "dead zone" is a portion of the output optical aperture that does not collect output signals. In effect, interspacing output ports with dead zones decreases the density of output ports and increases the size of the output optical aperture of the WSS.

The configuration in FIG. 3B accounts only for the $1^{st}$ order diffractions. As shown in FIG. 2B, other diffraction orders may also adversely affect port isolation. To avoid coupling of unwanted $2^{nd}$ order diffractions into non-selected ports, the interleaved port arrangement in FIG. 3B could space output port angles at $\pm 1\theta, \pm 3\theta, \pm 5\theta$, etc. and interleave dead zones at $\pm 2\theta, \pm 4\theta, \pm 6\theta$, etc. To also avoid $1^{st}$ order coupling against the blaze direction, the output ports could be interleaved at $+1\theta, -2\theta, +3\theta, -4\theta$, etc. and interleave dead zones at $-1\theta, +2\theta, -3\theta, +4\theta$, etc. As more unwanted diffraction orders are considered, port isolation increases; however, the number of dead zones and the size of the output optical aperture increase as well. Accordingly, the second approach is undesirable because it requires increasingly inefficient use of the output optical aperture to improve port isolation.

These two approaches respectively result in complex switching array control and calibration to suppress unwanted orders, and inefficient use of optical aperture due to unused output angle ranges. Accordingly, there is an unmet need for a WSS that achieves high port isolation by efficiently using its optical aperture without complex calibration and control of the switching array.

SUMMARY OF THE INVENTION

The present disclosure describes a wavelength selective switch (WSS) having an optical phased array switching engine which directs a selected diffraction order (typically, first order) of spatially separated input wavelength channels towards a region of densely packed output ports and concurrently directs all other diffraction orders away from that region, thereby achieving increased port isolation by efficiently using the output optical aperture without the need for complex calibration and control of the switching array.

An embodiment of the present disclosure provides a method for operating a wavelength selective switch (WSS) having M inputs, N outputs and a phased array switching engine (PASE), the method comprising: receiving an optical signal at one of the M inputs; spatially separating one or more wavelength channels from the received optical signal; directing the spatially separated wavelength channels to cells of the PASE; steering a wanted diffraction order of each spatially separated wavelength channel from each cell at an angle within a concentrated angular region relative to the PASE; steering all unwanted diffraction orders of spatially separated wavelength channels from all cells at angles outside the concentrated angular region; and directing each wanted diffraction order to one of the N outputs in accordance with the steering of the wanted diffraction orders.

Another embodiment of the present disclosure provides a wavelength selective switch (WSS) comprising: M inputs for receiving an optical signal; optics for spatially separating and directing one or more wavelength channels from the optical signal; a phased array switching engine (PASE) comprising cells, for steering a wanted diffraction order of each spatially separated wavelength channel from each cell at an angle within a concentrated angular region relative to the PASE, and for steering all unwanted diffraction orders of spatially separated wavelength channels from all cells at angles outside the concentrated angular region; optics for directing each wanted diffraction order to one of the N outputs in accordance with the steering of the wanted diffraction orders by the PASE.

BRIEF DESCRIPTION OF THE DRAWINGS

Embodiments of the present disclosure are described with reference to the following figures. While preferred embodiments may be illustrated or described herein, they are not intended to limit the invention. Rather, numerous changes including alternatives, modifications and equivalents may be made as would be understood by the person skilled in the art. As always, the invention is defined by the appended claims. For simplicity of illustration, the figures are not drawn to scale or dimension. For example, angles between components, light rays and other elements have been exaggerated for legibility purposes.

DETAILED DESCRIPTION

The present disclosure applies to wavelength selective switches (WSSs) having phased array switching engines, and more specifically, how those WSSs can be configured for high port isolation.

A phased array switching engine comprises an array of cells each of which receives an incident wavelength channel of light and imparts to it a programmable phase shift or tilt. When the phased array switching engine (PASE) comprises LCOS cells, the phase shift of a cell is controlled by varying the electrical voltage across a liquid crystal fluid. When the PASE comprises an array of tilting MEMS mirrors, each cell comprises a mechanical mirror in which each direction of tilt is controlled by varying the electrical voltage on the sides of the MEMS mirror aligned with the direction of tilt. The PASE may also comprise a matrix of cells, or an array of PASEs may be provided for multi-dimensional, M×N optical WSSs. For simplicity of explanation, and unless otherwise noted, the present disclosure describes the invention in the context of a 1×N optical WSS; however, it is well within the teachings of the present disclosure to extend the invention and this disclosure to M×N WSSs.

To impart an angular tilt to an incoming wavelength channel, a PASE creates a linearly varying phase shift vs. position along the array in the switching direction. However, the available phase shift in an LCOS cell is typically only about $2\pi$ radians. Larger deflection angles can be achieved by programming the desired phase ramp modulo $2\pi$, as shown in the phase profiles illustrated in FIG. 3A (prior art).

Figure 4:
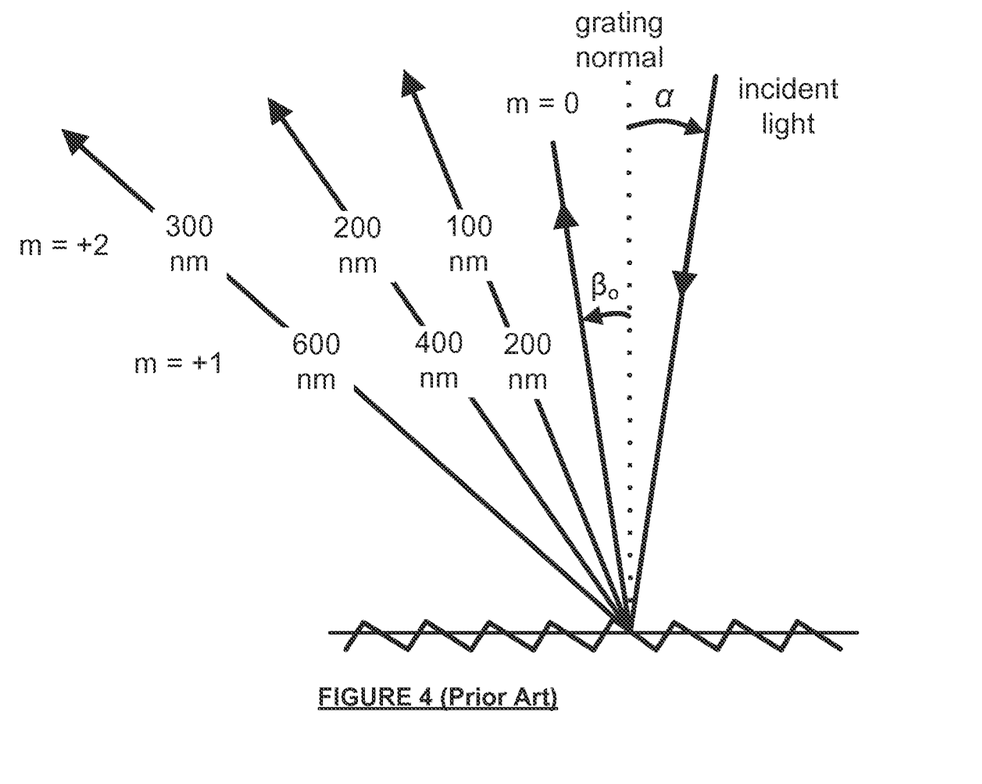
FIG. 4 is a top view of diffraction orders from multi-wavelength light incident on an existing blazed diffraction grating.

The saw-toothed PASE phase profile of the typical $2\pi$ reset phase profile resembles a phase diffraction grating that is blazed for high efficiency in the $1^{st}$ diffraction order (m=+1) for the well known grating equation $\sin\alpha + \sin\beta = m\lambda G$. In the grating equation, alpha ($\alpha$) is the angle of incidence of incoming light, beta ($\beta$) is the angle of diffracted light, m is an integer representing the diffraction order, lambda ($\lambda$) is the wavelength and G is the PASE grating frequency, such as "lines per millimeter". These quantities are illustrated in FIG. 4 which demonstrates a ray of multi-wavelength light incident to an existing blazed diffraction grating where different diffraction orders from different wavelengths overlap.

In WSSs, steering angles ($\alpha+\beta$) are typically less than 4°, but in some embodiments steering angles are less than 10°. Accordingly, the grating equation can be simplified using the small angle approximation $\sin(x) \approx x$. Substituting $\alpha$ for $\sin(\alpha)$ and $\beta$ for $\sin(\beta)$, the revised small angle grating equation becomes $\alpha+\beta \approx m\lambda G$.

The grating equation also illustrates that multiple diffraction orders (because m may take on any integer value, for example) are produced when the PASE receives incident light. The presence of multiple diffraction orders dispersed within a WSS makes achieving high port isolation more difficult because unwanted diffraction orders may be collected at non-selected ports.

When designing a WSS, it is convenient to measure the output port angles q relative to the zero order (m=0) reflection angle of light incident to the switching array, instead of, for example, measuring angles relative to a surface normal. This convention is also illustrated in FIG. 4. Using the revised small angle grating equation, $\alpha+\beta \approx m\lambda G$, the angle of the zero order reflection (m=0) is $\beta_0 = -\alpha$ for all wavelengths of incident light. Accordingly, $\alpha+\beta$ represents the diffracted angle relative to the zero order.

The steering angle of a switching array defines the angle between the reflected zero order and the selected diffraction order. Because the intensity of each diffraction order typically decreases as the absolute value of m increase, WSSs typically, select at least one of the first order diffractions (m=±1) for collection. When a WSS's selected diffraction order is m=+1, the quantity $\alpha+\beta$ is also known as the $1^{st}$ order steering angle of the switching array. By measuring WSS port angles Q relative to the zero order reflection, each port angle $Q_1$ through $Q_N$ can easily be configured equal to the steering angle required to direct incident light to that output port.

Figure 5A:
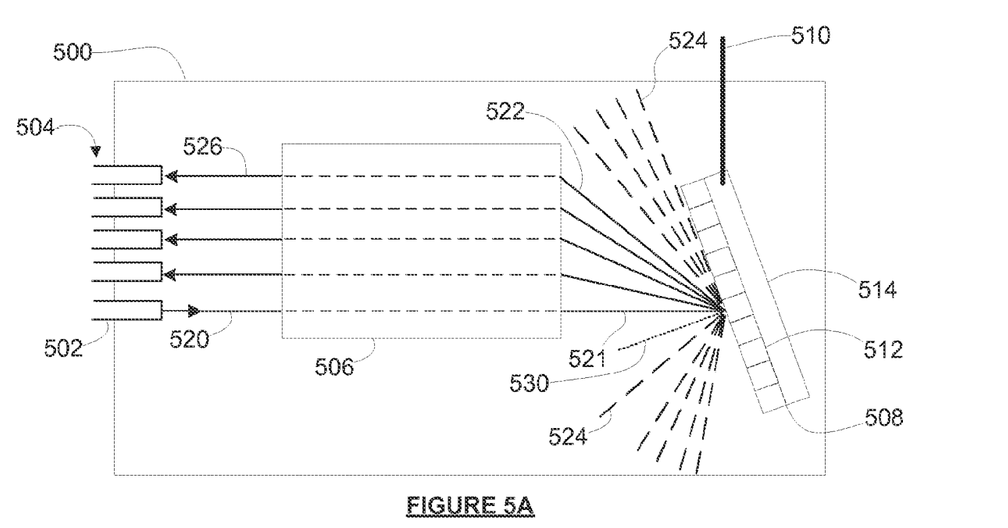
FIG. 5A is a partial side view in the switching plane of a WSS according to the present disclosure.
Figures 5B, 5C:
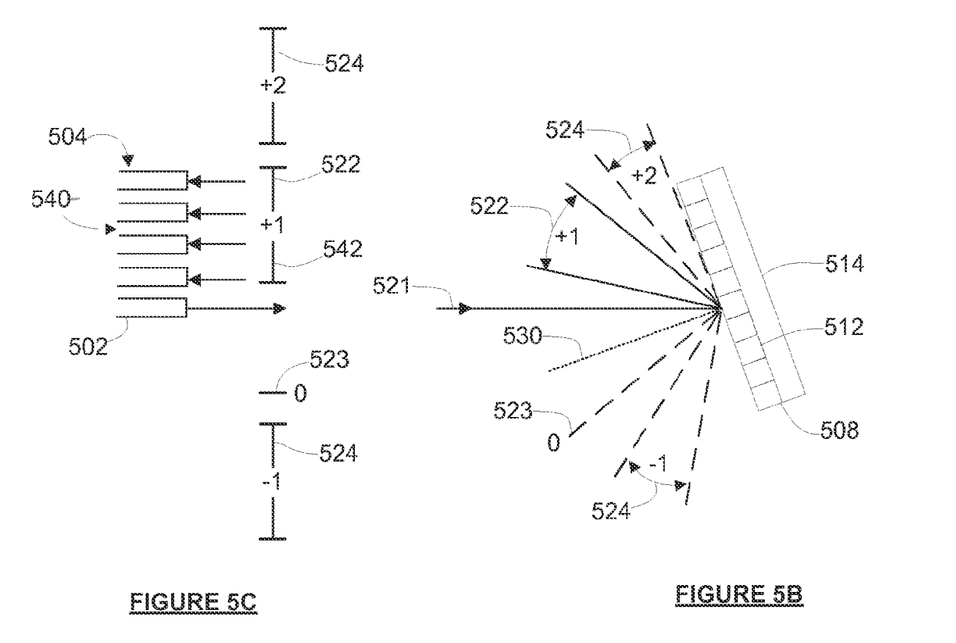
FIG. 5B is a partial side view in the switching engine of FIG. 5A.
FIG. 5C is a partial side view of the dispersion order alignment of the optical ports of FIG. 5A.

Turning now to FIGS. 5A, 5B and 5C a wavelength selective switch (WSS) 500 configured according to the present disclosure is illustrated. The WSS 500 comprises an input port 502, an array of output ports 504, optics 506, a phased array switching engine (PASE) 508 and a PASE control signal 510.

FIG. 5A, 5B and 5C illustrate optical paths in the switching plane of the WSS 500 with different channels of light being directed to each of the outputs. Input light 520 passes through optics 506, reflects off of PASE 508, passes a second time through optics 506, and is directed towards different output ports 504. The WSS 500 illustrates an example 1×4 input to output configuration having a reflective switching array. Other dimensions of WSS, including M inputs by N outputs (M×N arrays), are also contemplated within the scope of this embodiment, and within the scope of the present disclosure. The WSS 500 is a self-contained device with an optical input port 502, optical output ports 504 and a PASE control signal 510.

The input port 502 may comprise any optical fibre ports or other ports for transmitting light. In an M×N WSS, there would be M input ports 502 which may be spatially separated in the dispersion plane (not illustrated). Each input port 502 receives incoming light 520 and directs it towards optics 506. The incoming light 520 comprises one more wavelengths of light. Generally, incoming light 520 comprises multiple wavelength channels where each channel comprises a span or consecutive group of wavelengths. Any data may be transmitted over the wavelengths of input light 520.

The output ports 504 may comprise any optical fibre ports or other ports for transmitting light. In an M×N WSS, there would be N output ports 504 which may be spatially separated in the dispersion plane. Each input port 504 collects or couples incident light from within the WSS 500.

In an embodiment where the switching array 508 is refractive (and not reflective as in FIG. 5A) the output ports 504 may be located on the opposite side of the WSS 500 and additional optics 506 may be included between the PASE 508 and outputs 504. Such an embodiment is less advantageous because of the additional cost and space required for the additional optics.

The optics 506 may comprise any configuration of optical components for collecting incoming light 520, spatially separating different wavelength channels in a dispersion plane and directing the spatially separated wavelength channels 521 onto the switching engine 508. The optics 506 may collimate, focus, direct and/or spatially disperse input light 520 so that each wavelength channel 521 is focused, spatially separated and appropriately directed at the cells 512 of the phased array switching engine 508. The optics 506 also receive wanted diffractions of light 522 after tilting by the PASE 508, re-multiplex the wanted diffractions 522 in accordance with their tilts, then direct the re-multiplexed wanted diffractions 526 towards the appropriate output ports 504.

Figure 7A:
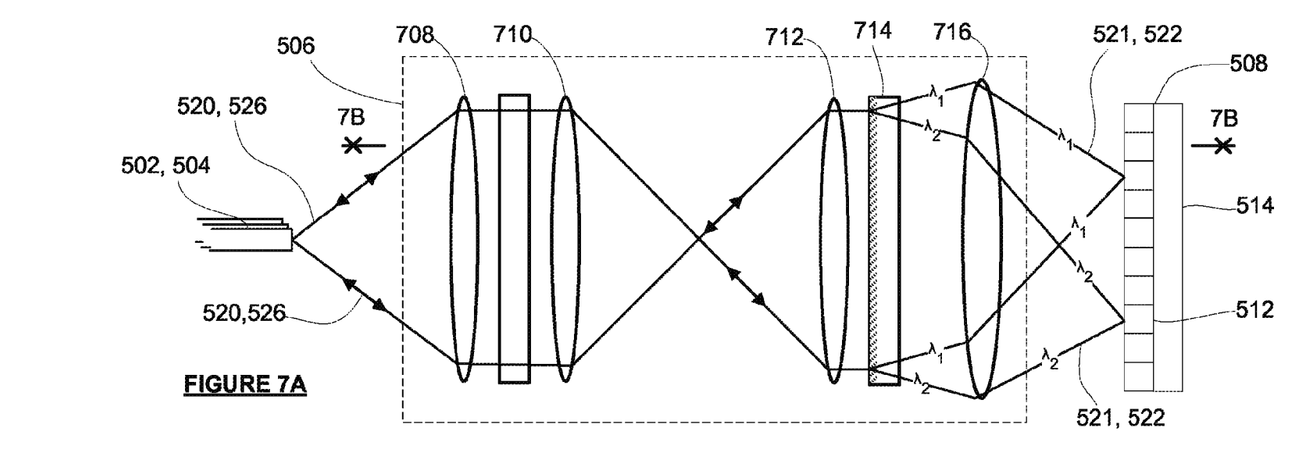
FIG. 7A is a partial side view in the dispersion plane of optical components of a WSS according to the present invention.
Figure 7B:
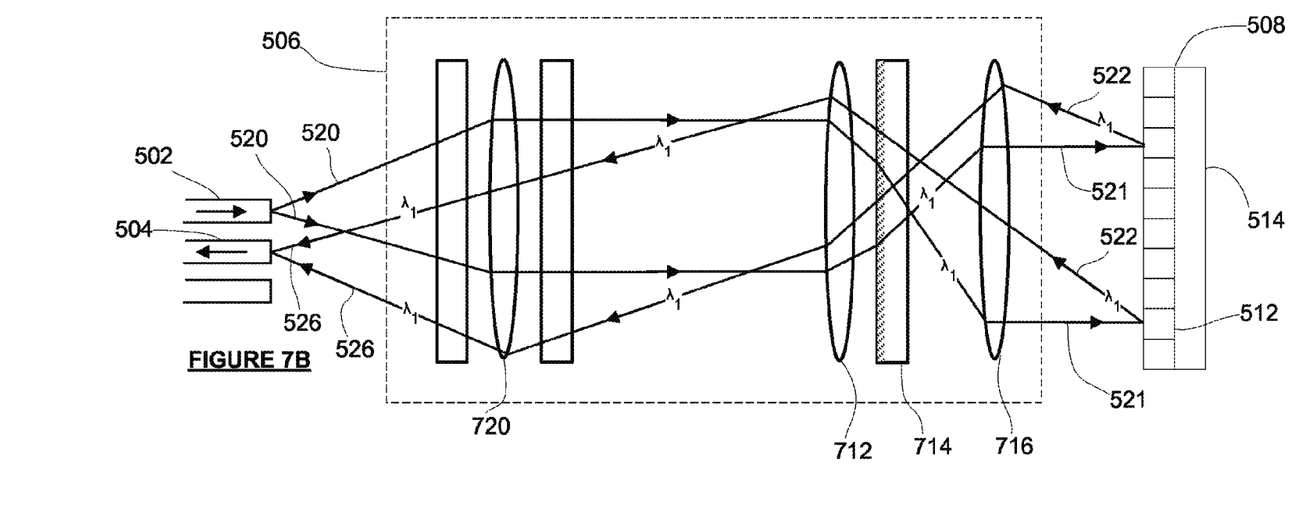
FIG. 7B is a partial side view in the switching plane of optical components of the WSS of FIG. 7A along line 7B.

There are many different WSS optical configurations known in the art and the present invention is not limited to any particular optics 506 configuration. For simplicity of description, all optical components between the optical ports 502, 504 and the switching engine 508 are abstractly represented as optics 506 and the path of light 520, 521, 522, 524 and 526 through the optics has been abstracted as a fine hashed line. FIGS. 7A and 7B, described later in greater detail, illustrate an example configuration of optical components which may be employed; however, any configuration of optical components, including, but not limited to cylindrical lenses, spherical lenses, diffraction gratings and other optical components as known in the art, may be used to achieve the functions of optics 506 within the WSS 500.

The phased array switching engine (PASE) 508 receives spatially separated wavelength channels of light 521 from the optics 506, applies a programmable tilt or phase shift to each wavelength channel, and transmits a plurality of wanted diffraction orders 522 and unwanted diffraction order 524. The switching engine 508 comprises an array of cells or elements 512 connected to a controller 514. Each cell 512 receives one of the spatially separated wavelengths of input light 521 and imparts a phase shift or tilt. The phase shift or tilt imparted by each cell 512 of the PASE 508 is individually programmable in accordance with control signals 510. The PASE control signal 510 may be an electrical control signal. Each cell 512 or element of the PASE 508 receives one or more of the spatially separated wavelengths of input light 521 and shifts its phase by the programmably controlled amount.

By configuring the phase shift or tilts imparted by each cell 512 of the PASE 508 as described below, it is possible to direct the wanted diffraction orders 522 within a concentrated region incident to the output ports 504 while directing the unwanted diffraction orders 524 outside of that concentrated region. This is illustrated in FIGS. 5B and 5C where the +1 diffraction orders are wanted diffraction orders 522 while the +2 and −1 diffraction orders are some of the unwanted diffraction orders 524.

Referring now to FIG. 5B, the angular ranges of diffraction orders of different wavelengths of light 521 refracted from the PASE 508 are illustrated. Incident separated wavelength channels of light 521 are refracted into a plurality of diffraction orders. The WSS 500 is configured to collect first order (m=+1) diffraction orders 522 in a concentrated region while directing all unwanted diffraction orders 524 away from that concentrated region. The zero order (m=0) reflection 523, first negative order (m=−1) diffractions 524 and second order (m=+2) diffractions 524 are directed away from the first order (m=+1) diffractions 522 which are all directed within a concentrated region. Other unwanted diffraction orders would also be present outside of the concentrated region, but are not illustrated.

Turning to FIG. 5C, the angular ranges of the diffraction orders are illustrated relative to the outputs 504. All wanted diffraction orders 522 are directed to a concentrated region, defined as the output optical aperture 542, for collection by the closely spaced 540 output ports 504. The unwanted orders 524 are directed away from the concentrated region of wanted diffraction orders 524 and consequently, away from the output optical aperture 542 and the closely spaced output ports 504. Each output port 504 may be arranged relative to its adjacent output ports 504 with adjacent port spacing 540 equal to the minimum port spacing θ required to avoid adjacent port crosstalk. Accordingly, high port isolation is achieved because the unwanted diffraction orders 524 are directed away from output ports 504 that are not selected to receive those diffraction orders.

In FIGS. 5A, 5B and 5C, the +1 diffraction orders are directed within the optical output aperture 540 while the unwanted diffraction orders 524 are not. By maintaining this division of wanted and unwanted diffraction orders, a WSS 500 according to the present invention is able to provide high port isolation without increasing WSS design complexity through complex control and calibration of the phase profile of the PASE 508 and without increasing the physical size of the WSS by interleaving unwanted diffraction orders into dead zones between output ports.

Figure 6:
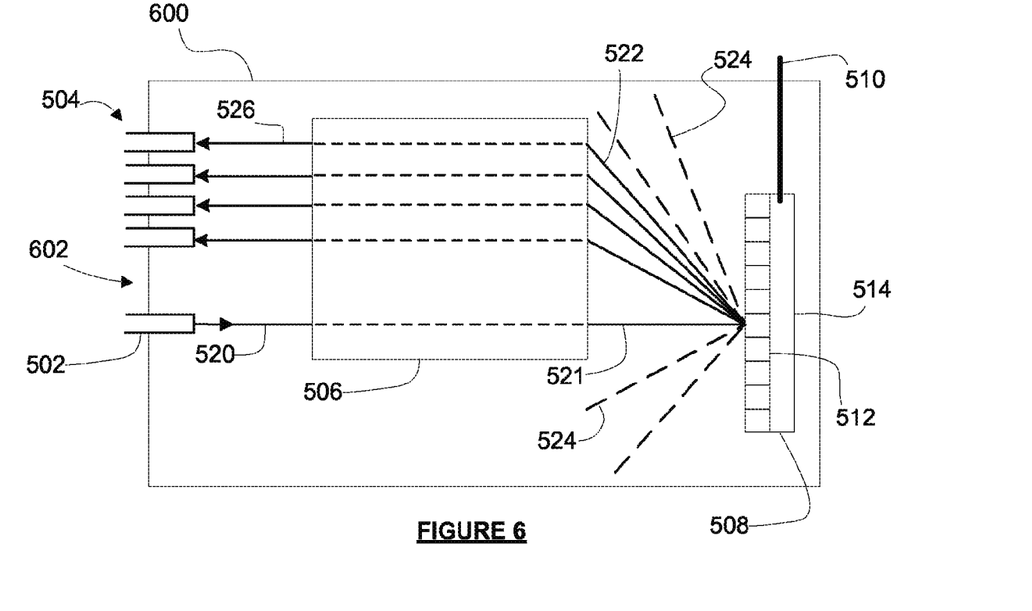
FIG. 6 is a partial side view in the switching plane of a further WSS according to the present disclosure.

FIG. 6 illustrates another WSS 600 according to the present disclosure where all identically numbered features are the same as described in respect of FIG. 5; however, light 521 incident to the PASE 508 is normal to the PASE 508. In FIGS. 5A and 5B, the PASE 508 receives incident light 521 at an angle relative to the surface normal 530 of the PASE 508. In some embodiments, this angle may be in the range of approximately 0.1 to approximately 2.0 degrees. By receiving incident light 521 at a small angle relative to the surface normal 530, the input 502 and output 504 ports may be consolidated in close proximity to one another advantageously reducing the physical size of the WSS 500. In the configuration illustrated in FIG. 6; however, a large gap 602 between the input port 502 and output ports 504 is created which disadvantageously increases the physical size of the WSS 600.

In other embodiments, the input port 502 may be directed at a different angle of incidence than the output ports 504 and the input port 502 may be located on a different side of the WSS 500 than the output ports 504. In FIG. 5A, the input port 502 and output ports 504 are illustrated on the same side of the WSS 500, however other configurations are possible, depending on the optical alignment of the switching array 508. In some embodiments, the PASE 508 is a refractive PASE which would require additional optics on the opposite side of the refractive PASE and may also require moving the output ports to the opposite side of the PASE.

FIGS. 7A and 7B illustrate one of many possible optical component 506, configurations in a WSS according to the present disclosure having a reflective PASE 508. For simplicity of illustration, incident light is normal to the surface of the PASE 508; however, unlike the other figures which depict light beams based on central rays of each beam, FIGS. 7A and 7B illustrate two marginal or edge light rays for each beam or wavelength channel to illustrate the optical imaging functions. FIG. 7A illustrates the effects of optical components on light rays in dispersion plane while FIG. 7B illustrates the same in the switching plane. These two planes are typically orthogonal to one another.

In the dispersion plane (FIG. 7A), when input light 520 travels from the input 502 to the switching engine 508, the goal is to spatially divide the input light 520 into wavelength channels $\lambda_1$, $\lambda_2$ at the switching engine 508. This creates wavelength dispersed images of the input at the switching engine so that successive cells 512 in the dispersion plane may each apply a different programmable tilt to whichever wavelength channel those cells 512 receive.

In FIG. 7A, the input 502 and output 504 optical ports are spatially aligned. In the dispersion plane, input light 520 is influenced by a first cylindrical lens in the dispersion plane 708, a second cylindrical lens in the dispersion plane 710, a first spherical lens 712, a diffraction grating 714, then a second spherical lens 716 before each spatially separated wavelength channel 521 is focused on a specific cell 512 of the switching engine 508. Tilted wavelength channels 522 from the switching engine 508 are influenced by the same optical components 716, 714, 712, 710, 708 in the reverse order.

In the switching plane (FIG. 7B) when tilted wavelength channels of light 521 travel from the switching engine 508 to the outputs 504, the goal is to transform the switching engine induced tilt into spatial and angular alignment of the wavelength channel 526 with its selected output port 504. As described above, it is only the wanted dispersion order(s) that is/are aligned with the outputs while any unwanted dispersion orders are directed away from the optical output aperture. In some embodiments, the spatial and angular alignment of tilted wavelength channels in the switching plane occurs in the height dimension of the WSS.

Turning to FIG. 7B, the input 502 and output 504 optical ports are now spatially separated in the switching plane. Input light 520 is influenced by a first cylindrical lens in the switching plane 720, the first spherical lens 712, the diffraction grating 714, and then the second spherical lens 716 before reaching cells 512 of the switching engine 508. Tilted wavelength channels 522 from the switching engine 508 are influenced by the same optical components 716, 714, 712, 710, 720 in the reverse order to be aligned for collection by the selected output ports 504.

Figure 8:
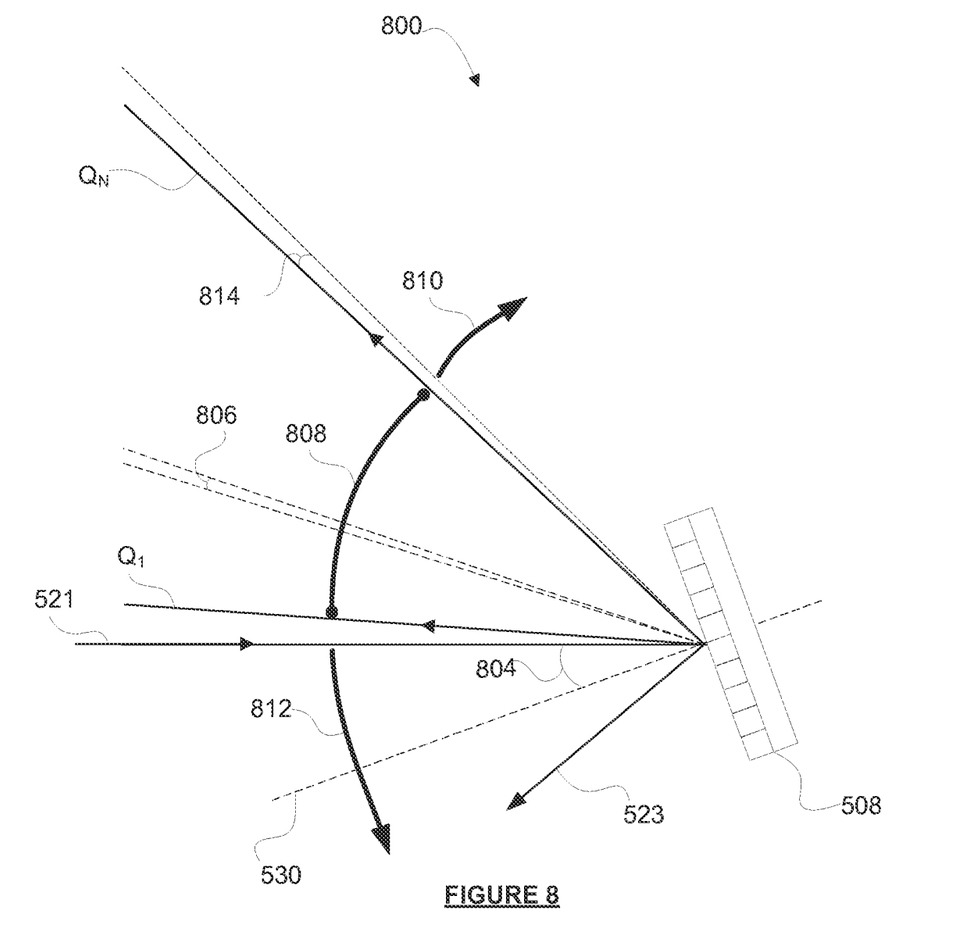
FIG. 8 is a partial side view of a WSS according to the present disclosure.

Turning now to FIG. 8, a PASE configuration 800 is illustrated. To achieve the desired separation of wanted and unwanted diffraction orders the PASE 508 is configured such that all wanted diffractions are directed from the PASE 508 at a maximum angle that is less than the lowest angle of the next higher diffraction order and at a minimum angle that is more than the greatest angle of the next lower diffraction order.

In FIG. 8, spatially separated wavelength channels of light 521 are incident at an angle 804 to the surface normal 530 of a phased array switching engine (PASE) 508. An array of N closely spaced output ports (not illustrated in FIG. 8) is configured to receive optical signals in accordance with angles $Q_1$ through $Q_N$, inclusive, relative to the zero order reflection 523 of light incident to the PASE 508. The angular spacing 806 between two adjacent channels is identified as θ and accords with the minimum spacing of output ports (540 in FIG. 5C) necessary to avoid adjacent channel crosstalk. The concentrated angular region 808 between $Q_1$ and $Q_N$ defines the optical output aperture (542 in FIG. 5C) where the angle of the lowest angle output port is $Q_1$ and the angle of the highest angle output port is $Q_N$. All wanted dispersion orders are diffracted from the PASE 508 within the concentrated angular region 808 while any unwanted dispersion orders are diffracted at angles outside 810, 812 the concentrated angular region 808, and consequently, outside the optical output aperture 542.

By arranging the port angles $Q_1$ through $Q_N$ such that $Q_N+\Delta=2Q_1$, where Δ represents a margin 814 to allow for misalignments and other imperfections, the unwanted second order diffractions from the wavelength channel steered to the lowest angle port $Q_1$ will be directed at an angle that is Δ greater than the highest angle port $Q_N$. Similarly, any other unwanted positive-integer orders from all wavelengths will be directed at angles greater than the angle of the highest angle port $Q_N$. Any unwanted zero order reflections 523 and negative-integer orders from all wavelengths will be directed at angles 812 less than the angle of the lowest angle port $Q_1$.

As a numerical example, consider a WSS for collecting first order (m=+1) diffractions having M=1 input ports, N=16 output ports, PASE grating frequency G spanning from 19.1 lines/mm to 36.0 lines/mm, minimum port spacing 806 of θ=0.1°, and margin 814 of Δ=0.2°. For a wavelength of 1.55 microns, the angle of the lowest angle port $Q_1$ relative to the zero order reflection is 1.7° while the angle of the highest angle port $Q_N$ is 3.2°. The unwanted second order diffractions from the lowest port angle $Q_1$ commence at an angle of 3.4°, just outside of the concentrated angular region 808. To avoid adjacent port crosstalk problems, the minimum port spacing θ is typically about 4 times the Gaussian beam diffraction half angle (which is a measure of the angular width of a beam). In this example, θ=0.1° would correspond to a diffraction half angle of 0.025° and a Gaussian beam waist radius of 1130 microns.

Figure 9:
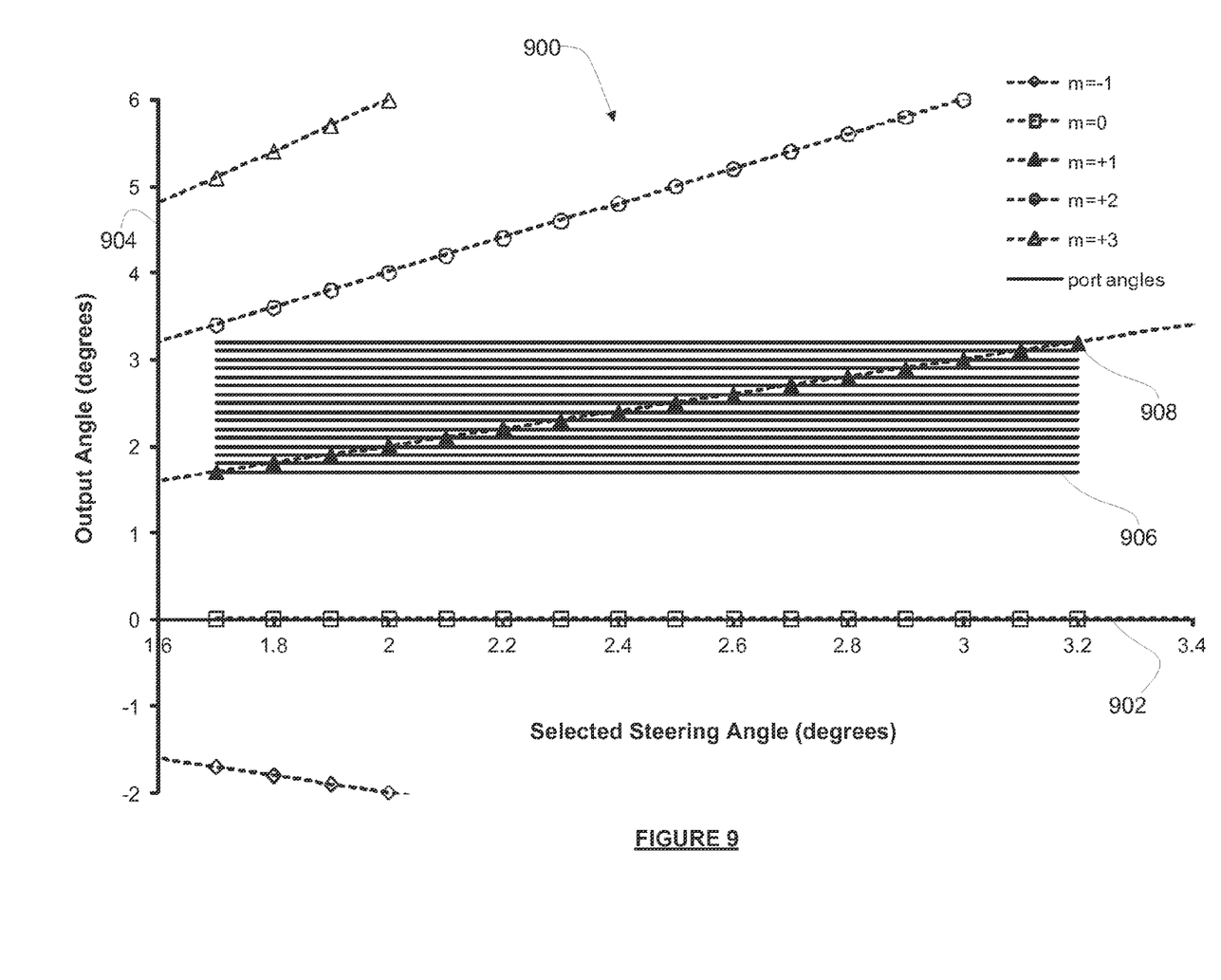
FIG. 9 is a graphic of diffraction order output angles versus selected steering angles illustrating port isolation from collecting unwanted diffraction orders according to the present disclosure.

The angles of the output ports and diffraction orders (−1≤m≤3), are shown in FIG. 9 for a single wavelength of 1.55 microns. In graph 900, the horizontal axis 902 represents different 1$^{st}$ order steering angles that can be programmed onto a PASE, while the vertical axis 904 represents different angles of diffracted light for a selected wavelength channel from the PASE. The 16 different output port angles 306 are illustrated in graph 900 as horizontal solid lines 906 spaced apart by the minimum port spacing θ. The desired m=+1 diffraction order angles 908 for each steering angle configuration are illustrated with solid triangular data point markers on a hashed trend line. The closest unwanted diffraction orders (m=−1, m=0, m=+2, m=+3) are illustrated on hashed trend lines with hollow diamond, hollow square, hollow circle and hollow triangle data point markers respectively. Over the range of steering angles used (1.7° to 3.2°), only the desired m=+1 diffraction orders overlap with the port angles while all other integer orders lie outside of the port angle range. Accordingly, this configuration of phased array switching engine steering angles eliminates port isolation penalties from unwanted integer diffraction orders.

Figure 10:
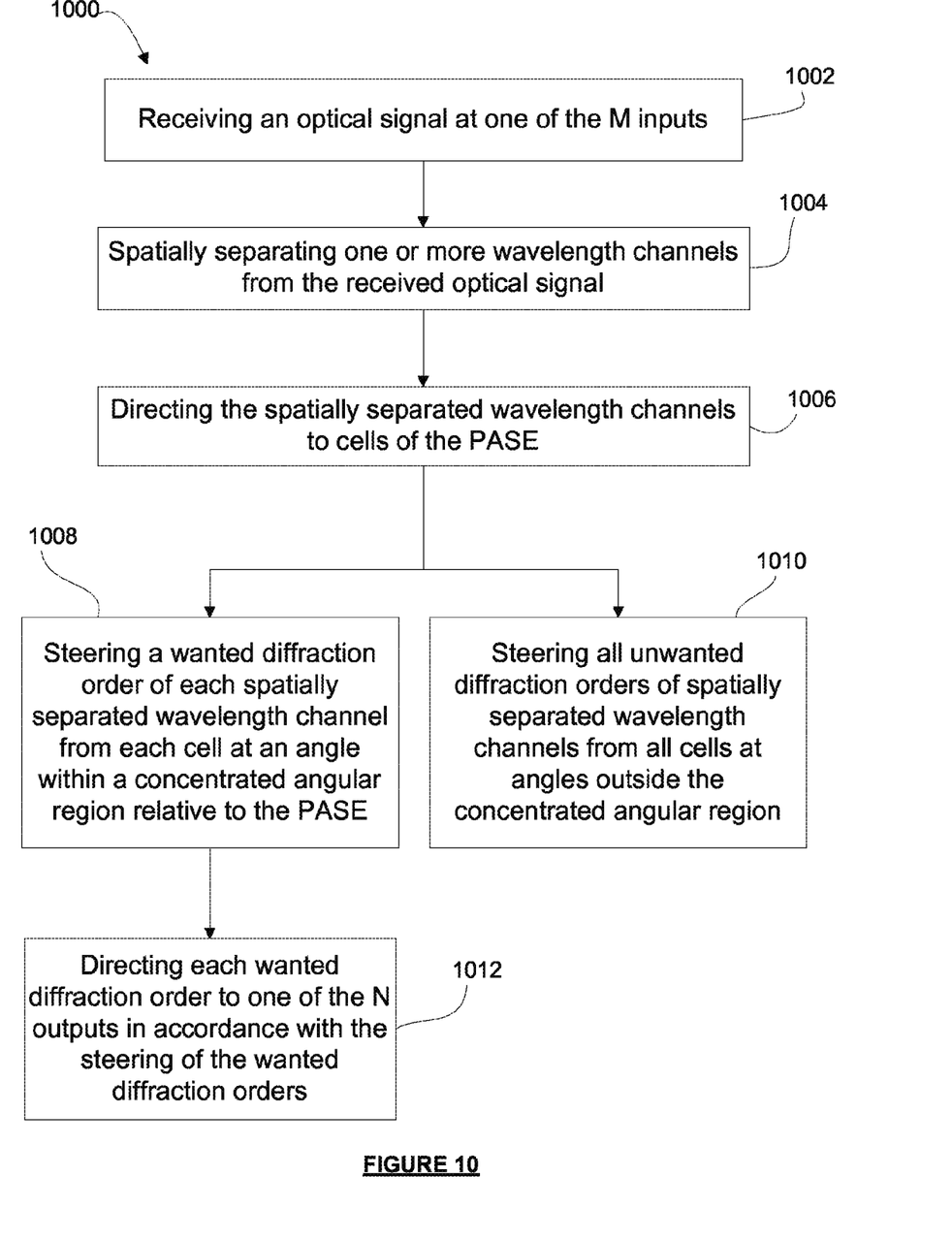
FIG. 10 illustrates an example method according to the present disclosure.

Turning to FIG. 10, an example method 1000 for operating a wavelength selective switch (WSS) having M inputs, N outputs and a phased array switching engine (PASE) is illustrated. At 1002 an optical signal is received at one of the M inputs. For example, input light 520, received through input port 502. At 1004, the optical signal is spatial separated into one or more wavelength channels and at 1006, the spatially separated wavelength channels are directed to the cells 512 of the PASE 508. Actions 1004 and 1006 may occur concurrently when input light is transmitted through optics 506 which spatially separate, in a dispersion plane, the input light 520 into different wavelength channels and direct the spatially separated wavelength channels 521 to the PASE 508.

At 1008, the cells 512 of the PASE 508 steer a wanted diffraction order 522 of each spatially separated wavelength channel 521 at an angle from each cell 512 within a concentrated angular region 808 relative to the PASE 508. At 1010, the cells 512 of the PASE 508 steer all unwanted diffraction orders 524 of the spatially separated wavelength channels 521 from the cells 512 at angles outside the concentrated region 808. As illustrated in FIG. 10, actions 1008 and 1010 occur simultaneously at the cells 512 of the PASE 508.

The PASE 508 imparts a phase shift or tilt to incident light that is programmable based on the PASE control signal 510. The switching engine 508 is configured such that the wanted dispersion orders 522 are directed towards the optics 506 in a concentrated region 808 while the unwanted dispersion orders 524 are directed outside the concentrated region 808 into other regions 810, 812. Although some of the Figures illustrate unwanted diffractions 524 dispersed at wide angles outside of the angular range of optics 506, in some embodiments the unwanted diffractions 524 are directed through optics 506 but on angles that are outside of the concentrated region 808 and ultimately outside the optical output aperture 542 containing output ports 504, as illustrated in FIG. 5C. The optics 506 collect the wanted dispersion orders 522 and direct them to the concentrated region 808 containing the output ports 504 while directing any unwanted dispersions 524 outside of that concentrated region.

All wanted steering orders 522 are directed within the concentrated region 808. The concentrated angular region is defined by a largest steering angle $Q_N$ and a smallest steering angle $Q_1$. Both steering angles are defined relative to the zero order reflection of the spatially separated wavelength channels 521 from the PASE 508. So that all unwanted diffraction orders are steered at angles outside the concentrated region, the largest steering angle is selected to be a margin 814 less than twice the smallest steering angle. As described above, this margin 814 is included to allow for misalignments and other imperfections which could otherwise cause unwanted diffraction orders 524 to be collected at unselected output ports.

At 1012, the wanted diffraction orders 522 are directed to one of the N outputs 504 in accordance with the steering imparted by the PASE 508 cells 512. In some embodiments, the N outputs may be closely spaced output ports that are consecutively aligned within the concentrated angular region 808 defining the output optical aperture 542. The outputs may be spaced apart by the minimum port spacing to avoid adjacent channel crosstalk, for example, 0.1°. In some embodiments, the M inputs may also be closely spaced to the N outputs by aligning the angle of light incident to the PASE 508 at a non-normal angle.

Accordingly, the N outputs 504 are configured to receive the wanted diffraction orders 522, coupled to the appropriate output ports 504 in accordance with the steering angle programmably imparted by the cells 512 of the PASE 508 while at the same time steering the unwanted diffraction orders 524 at angles outside of the concentrated angular region 808 containing the wanted diffraction orders 522. Thus a WSS according to the present disclosure can prevent the unwanted diffraction orders 524 being coupled to the output ports 504 and can significantly improve port isolation in the WSS.

Where examples, alternative embodiments and additional aspects of those embodiments have been described in the present disclosure, those examples embodiments and aspects may be combined in any manner within a single embodiment unless the present disclosure suggests otherwise.

I claim:

1. A method for operating a wavelength selective switch (WSS) having M inputs, N outputs and a phased array switching engine (PASE), the method comprising:
   receiving an optical signal at one of the M inputs;
   spatially separating one or more wavelength channels from the received optical signal;
   directing the spatially separated wavelength channels to cells of the PASE;
   steering a wanted diffraction order of each spatially separated wavelength channel from each cell at an angle within a concentrated angular region relative to the PASE;
   steering all unwanted diffraction orders of spatially separated wavelength channels from all cells at angles outside the concentrated angular region; and
   directing each wanted diffraction order to one of the N outputs in accordance with the steering of the wanted diffraction orders.

2. The method of claim 1 wherein the concentrated angular region is defined by a largest steering angle relative to a zero order reflection of the spatially separated wavelength channels from the PASE and a smallest steering angle relative to the zero order reflection wherein the largest steering angle is a margin less than twice the smallest steering angle.

3. The method of claim 2 wherein the margin is approximately 0.2°.

4. The method of claim 2 wherein the largest steering angle is less than approximately 10°.

5. The method of claim 1 further comprising: closely spacing consecutive output ports of the N outputs such that each output port has an output port angle within the concentrated angular region.

6. The method of claim 5 wherein closely spacing consecutive output ports further comprises: spacing apart consecutive output ports by a spacing approximately equivalent to a minimum spacing necessary to avoid channel crosstalk.

7. The method of claim 1 further comprising closely spacing the M inputs proximate to the N outputs by aligning the PASE at an angle between approximately 0.1° to approximately 2.0° relative to incident light.

8. The method of claim 1 further comprising selecting the PASE from the group consisting of a liquid crystal on silicon (LCOS) PASE and a microelectromechanical systems (MEMS) mirrors PASE.

9. The method of claim 1 further comprising programmatically controlling the steering angle imparted by each cell of the PASE.

10. A wavelength selective switch (WSS) comprising:
    M inputs for receiving an optical signal; optics for spatially separating and directing one or more wavelength channels from the optical signal;
    a phased array switching engine (PASE) comprising cells for imparting a phase shift or tilt to each wavelength channel,
    a controller programmed for configuring the phase shift or tilts imparted by each cell for steering a wanted diffraction order of each spatially separated wavelength channel from each cell at an angle within a concentrated angular region relative to the PASE, and for steering all unwanted diffraction orders of spatially separated wavelength channels from all cells at angles outside the concentrated angular region; and
    optics for directing each wanted diffraction order to one of the N outputs in accordance with the steering of the wanted diffraction orders by the PASE.

11. A wavelength selective switch (WSS) comprising:
    M inputs for receiving an optical signal; optics for spatially separating and directing one or more wavelength channels from the optical signal;
    a phased array switching engine (PASE) comprising cells, for steering a wanted diffraction order of each spatially separated wavelength channel from each cell at an angle within a concentrated angular region relative to the PASE, and for steering all unwanted diffraction orders of spatially separated wavelength channels from all cells at angles outside the concentrated angular region; and
    optics for directing each wanted diffraction order to one of the N outputs in accordance with the steering of the wanted diffraction orders by the PASE;
    wherein the concentrated angular region is defined by a largest steering angle relative to a zero order reflection of the spatially separated wavelength channels from the PASE and a smallest steering angle relative to the zero order reflection wherein the largest steering angle is a margin less than twice the smallest steering angle.

12. The WSS of claim 11 wherein the margin is approximately 0.2°.

13. The WSS of claim 12 wherein the largest steering angle is less than approximately 10°.

14. The WSS of claim 11, wherein the N outputs comprise closely spaced consecutive output ports, each output port having an output port angle within the concentrated angular region.

15. The WSS of claim 14 wherein the closely spaced consecutive output ports further comprise output ports spaced apart by a spacing approximately equivalent to the minimum spacing necessary to avoid channel crosstalk.

16. The WSS of claim 11, wherein the M inputs comprise M closely spaced inputs proximate to the N outputs and the PASE comprises a PASE aligned at an angle between approximately 0.1° and approximately 2.0° relative to the spatially separated wavelength channels.

17. The WSS of claim 11, wherein the PASE is selected from the group consisting of a liquid crystal on silicon (LCOS) PASE and a microelectromechanical systems (MEMS) mirrors PASE.

18. The WSS of claim 11, further comprising a control signal for programmatically controlling the steering angle imparted by each cell of the PASE.

19. The WSS of claim 10, wherein the concentrated angular region is defined by a largest steering angle relative to a zero order reflection of the spatially separated wavelength channels from the PASE and a smallest steering angle relative to the zero order reflection wherein the largest steering angle is a margin less than twice the smallest steering angle.

20. The WSS of claim 19, wherein the margin is approximately 0.2°; and wherein the largest steering angle is less than approximately 10°.

* * * * *